(12) United States Patent
Hsu

(10) Patent No.: US 8,553,574 B2
(45) Date of Patent: Oct. 8, 2013

(54) METHOD OF HANDLING PACKET ERROR IN A WIRELESS COMMUNICATION SYSTEM AND RELATED COMMUNICATION DEVICE

(75) Inventor: Chia-Chun Hsu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 549 days.

(21) Appl. No.: 12/723,688

(22) Filed: Mar. 15, 2010

(65) Prior Publication Data

US 2010/0232363 A1 Sep. 16, 2010

Related U.S. Application Data

(60) Provisional application No. 61/160,348, filed on Mar. 16, 2009.

(51) Int. Cl.
*H04W 76/02* (2009.01)
*H04W 84/12* (2009.01)
*H04L 1/00* (2006.01)

(52) U.S. Cl.
USPC ........... 370/252; 370/329; 370/338; 455/423; 714/799

(58) Field of Classification Search
USPC ................ 370/252, 278, 328, 329, 338; 455/422.1, 423, 450; 714/799
See application file for complete search history.

(56) References Cited

U.S. PATENT DOCUMENTS

| 4,908,828 | A | 3/1990 | Tikalsky |
| 7,697,535 | B2* | 4/2010 | Patel et al. ................. 370/392 |
| 2008/0310395 | A1* | 12/2008 | Kashima ..................... 370/350 |
| 2009/0156194 | A1* | 6/2009 | Meylan .................... 455/422.1 |
| 2009/0186613 | A1* | 7/2009 | Ahn et al. .................. 455/434 |
| 2009/0316586 | A1* | 12/2009 | Yi et al. ..................... 370/242 |
| 2009/0316637 | A1* | 12/2009 | Yi et al. ..................... 370/329 |
| 2010/0041370 | A1* | 2/2010 | Narasimha et al. ........... 455/410 |
| 2010/0202288 | A1* | 8/2010 | Park et al. .................. 370/230 |
| 2010/0232364 | A1* | 9/2010 | Hsu ............................ 370/328 |

FOREIGN PATENT DOCUMENTS

| EP | 1 274 203 A1 | 1/2003 |
| EP | 1 511 245 A2 | 3/2005 |
| WO | 2008084955 A1 | 7/2008 |

OTHER PUBLICATIONS

3rd Generation Partnership Project; Technical Specification Group Radio Access Network; Evolved Universal Terrestrial Radio Access (E-UTRA) Medium Access Control (MAC) protocol specification (Release 8), 3GPP TS 36.321 V8.5.0 (Mar. 2009), pp. 1-43, XP050377621, Sophia Antipolis Valbonne, France.
Office action mailed on Apr. 10, 2013 for the Taiwan application No. 099107671, filed Mar. 16, 2010, p. 1-7.

* cited by examiner

*Primary Examiner* — Chi Pham
*Assistant Examiner* — Ahmed Elallam
(74) *Attorney, Agent, or Firm* — Winston Hsu; Scott Margo

(57) ABSTRACT

A method of handling packet error for a communication device in a wireless communication system is disclosed. The method comprises the steps of: obtaining a payload from a received protocol data unit (PDU) and verifying the payload according to a predetermined payload format.

25 Claims, 9 Drawing Sheets

METHOD OF HANDLING PACKET ERROR IN A WIRELESS COMMUNICATION SYSTEM AND RELATED COMMUNICATION DEVICE

CROSS REFERENCE TO RELATED APPLICATIONS

This application claims the benefit of U.S. Provisional Application No. 61/160,348, filed on Mar. 16, 2009 and entitled "METHOD AND APPARATUS FOR ERROR HANDLING OF MAC PDU AND RANDOM ACCESS RESPONSE IN A WIRELESS COMMUNICATIONS SYSTEM" the contents of which are incorporated herein.

BACKGROUND OF THE INVENTION

1. Field of the Invention

The present invention relates to a method used in a wireless communication system and related communication device, and more particularly, to a method of handling packet error for in a wireless communication system and related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

In LTE system, a media access control (MAC) layer provides data transfer services on logical channels. When MAC uses a physical downlink control channel (PDCCH) to indicate radio resource allocation, what kind of a radio network temporary identifier (RNTI) mapped on the PDCCH is used depending on the logical channel type, for example, a cell radio network temporary identifier (C-RNTI), a temporary C-RNTI and a Semi-Persistent scheduling C-RNTI are used for a dedicated control channel (DCCH) and dedicated traffic channel (DTCH), and a random access radio network temporary identifier (RA-RNTI) is used for random access response on a downlink share channel (DL-SCH). When a random access (RA) procedure is initiated by a PDCCH order or by the MAC sub layer, a MAC protocol data unit (MAC PDU) sent by the network is used to carry MAC random access response (MAC RAR) with timing information.

Please refer to FIG. 1, which is a schematic diagram of a MAC PDU in the prior art. As shown in FIG. 1, the MAC PDU consists of a MAC header and one or more MAC RARs and optionally padding. The MAC header is added at the beginning of a network packet in order to turn it into a frame ready for transmission over the network. The MAC header is of variable size and consists of one or more MAC sub-headers. Each MAC sub-header corresponds to a MAC RAR, except for a backoff indicator (BI) sub-header. Please refer to FIG. 2, which is a schematic diagram of the MAC sub-header of the MAC PDU shown in FIG. 1. As shown in FIG. 2, the MAC sub-header consists of three header fields E/T/RAPID. The BI sub-header consists of five header fields E/T/R/R/BI. The E field represents the extension field, which is a flag indicating if MAC sub-headers are present in the MAC header or not. The E field is set to "1" to indicate another set of at least E/T/RAPID or E/T/R/BI. The E field is set to "0" to indicate that a MAC RAR starts at the next byte. The T field, the type field, is a flag indicating whether the MAC sub-header contains a random access preamble identifier (RAPID) or a backoff indicator. The T field is set to "0" to indicate the presence of the backoff indicator field in the BI sub-header. The T field is set to "1" to indicate the presence of the RAPID field in the sub-header. The R field is a reserve bit, set to "0". The BI field identifies the overload condition in the cell. The size of the BI field is four bits. The RAPID field identifies a random access preamble previously transmitted by the UE for initiation of the RA procedure. The size of the RAPID field is six bits.

Please refer to FIG. 3, which is a schematic diagram of a MAC RAR. The MAC RAR is of fixed size and consists of the following fields. The R field is a reserve bit, set to "0". A timing advance (TA) command field indicates the index value $T_A$ (0-1282) used to control the amount of timing adjustment that the UE has to apply. The size of the timing advance command field is eleven bits. An uplink grant field indicates the resources to be used on the uplink. The size of the uplink grant field is twenty bits. A temporary C-RNTI field indicates the temporary identity that is used by the UE during random access procedure. The size of the Temporary C-RNTI field is sixteen bits.

As can be seen from the above, the MAC transmission associates with specific usage of RNTIs and packet formats. According to the LTE specification, when the MAC entity receives the MAC PDU identified by C-RNTI and Semi-Persistent scheduling CRNTI associated with the UE, namely, MAC PDU mapped to DTCH and DCCH, the MAC entity discards the received MAC PDU if the MAC PDU contains invalid values. However, for the MAC PDU mapped to a CCCH (Common Control Channel), there has been no error handling behavior specified yet.

In addition, during the RA procedure, when the MAC PDU related to MAC RAR is received, there has been no error handling behavior specified for the MAC RAR content so far. It is still unclear whether the UE shall consider the MAC RAR reception is unsuccessful if an invalid MAC RAR is received.

SUMMARY OF THE INVENTION

It is thereof an objective of the present invention to provide a method of handling MAC packet errors in a wireless communication system and related communication device, to avoid procedure error.

The present invention discloses a method of handling packet error for a communication device in a wireless communication system, the method comprising the steps of: obtaining a payload from a received protocol data unit (PDU) and verifying the payload according to a predetermined payload format.

The present invention further discloses a communication device of a communication system for error handling. The communication device includes a computer readable recording medium, and a processor. The computer readable recording medium is used for storing program code corresponding to a process. The processor is coupled to the computer readable recording medium, and used for processing the program code to execute the process. The process comprises the steps of: obtaining a payload corresponding to the communication device from a protocol data unit (PDU) and verifying the payload according to a predetermined payload format.

The present invention further discloses a communication device of a communication system for handling packet error. The communication device includes a reception unit and a verification unit. The reception unit is used for obtaining a payload corresponding to the communication device from a protocol data unit (PDU). The verification unit is used for verifying the payload according to a predetermined payload format.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
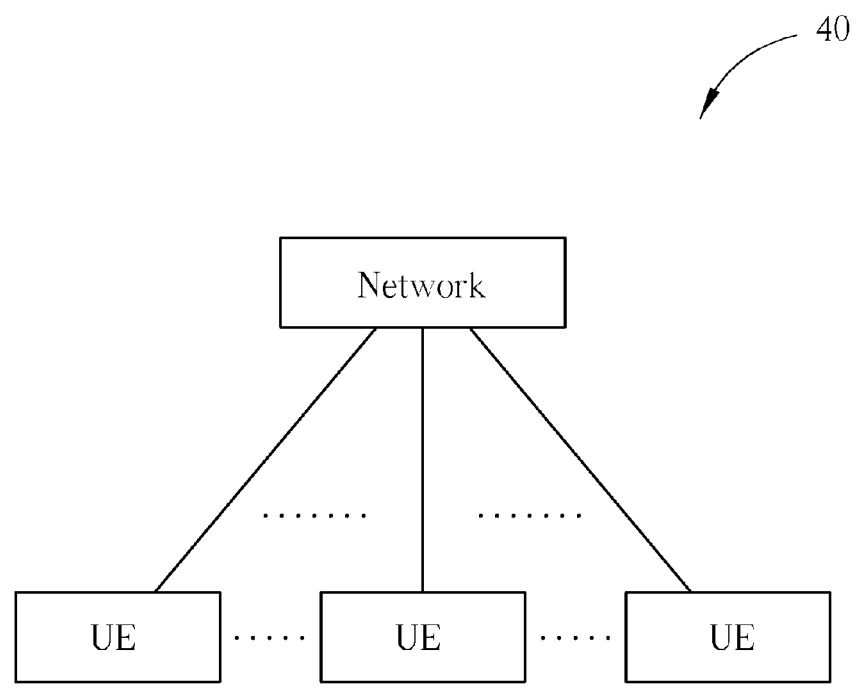
FIG. 4 is a schematic diagram of a wireless communication system according to an embodiment of the present invention.

Please refer to FIG. 4, which is a schematic diagram of a wireless communication system 40 according to an embodiment of the present invention. The wireless communication system 40, such as an LTE (long-term evolution) system or other mobile communication systems, is briefly composed of a network and a plurality of user equipments (UEs). In FIG. 4, the network and the UEs are simply utilized for illustrating the structure of the wireless communication system 40. Practically, the network comprising a plurality of base stations, such as an E-UTRAN (evolved-UTAN) comprising a plurality of evolved Node-Bs (eNBs) in the LTE system. The UEs can be devices such as mobile phones, computer systems, etc. Besides, the network and the UE can be seen as a transmitter or receiver according to transmission direction, e.g., for uplink, the UE is the transmitter and the network is the receiver, and for downlink, the network is the transmitter and the UE is the receiver.

Figure 5:
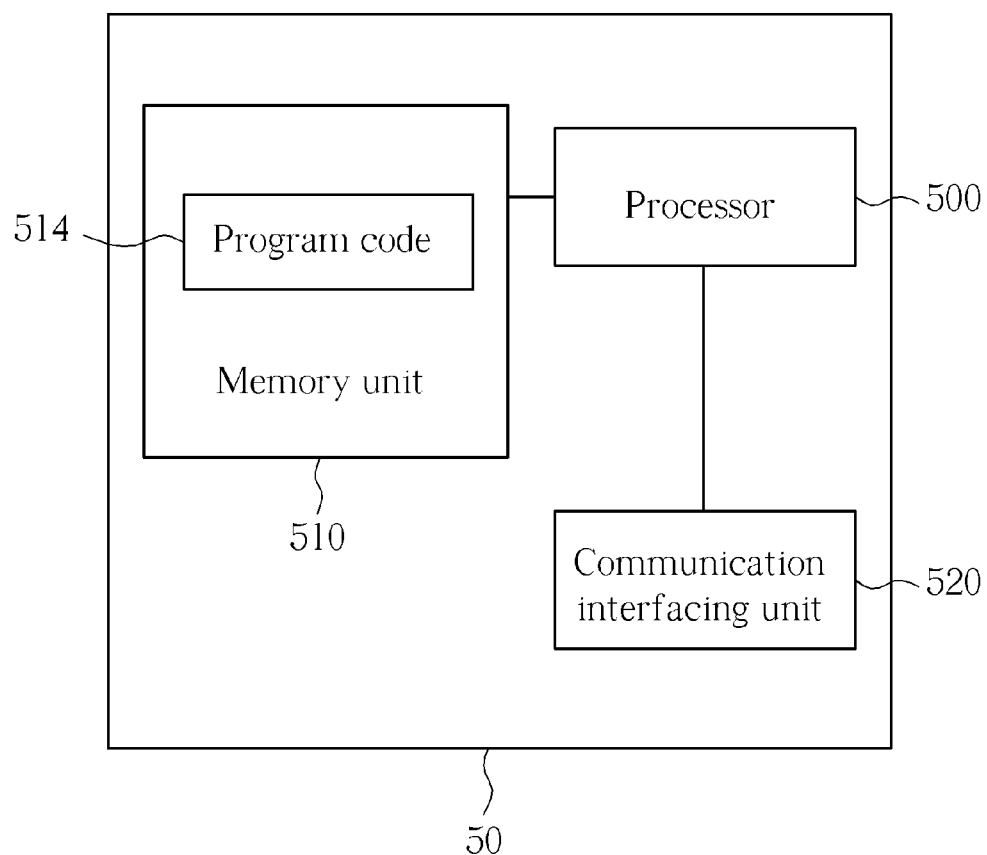
FIG. 5 is a schematic diagram of a communication device according to embodiments of the present invention.

Please refer to FIG. 5, which is a schematic diagram of a communication device 50 according to embodiments of the present invention. The communication device 50 can be the UE shown in FIG. 4 and may include a processor 500 such as a microprocessor or ASIC, a memory unit 510, and a communication interfacing unit 520. The memory unit 510 may be any data storage device that stores program code 514 for access by the processor 500. Examples of the memory unit 510 includes but are not limited to a subscriber identity module (SIM), read-only memory (ROM), random-access memory (RAM), CD-ROMs, magnetic tapes, hard disks, optical data storage devices. The communication interfacing unit 520 may be preferably a radio transceiver and accordingly exchanges wireless signals according to processing results of the processor 500.

Figure 6:
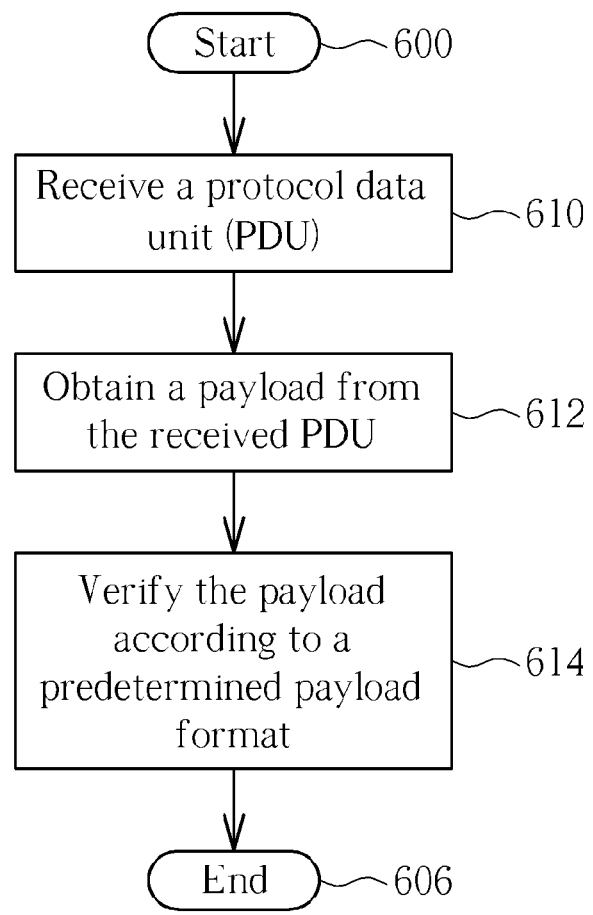
FIG. 6 is a flowchart of a process according to an embodiment of the present invention.

Please refer to FIG. 6, which is a flowchart of a process 60 according to an embodiment of the present invention. The process 60 is utilized for handling packet errors for a UE in a wireless communication system. The process 60 can be compiled into the program code 514 and includes the following steps:

Step 600: Start.
Step 610: Receive a protocol data unit (PDU).
Step 612: Obtain a payload from the received PDU.
Step 614: Verify the payload according to a predetermined payload format.
Step 616: End.

According to the process 60, the PDU is received via any procedure, and the payload is obtained from the received PDU. Subsequently, the payload is verified for handling packet error for the UE in a wireless communication system. The predetermined payload format includes format related to a length and value range of payload elements, previously established between the UE and the network. If the verification shows the payload is invalid, the embodiment of the present invention takes next actions to prevent the UE from applying an invalid field value, thereby avoiding procedure error.

For example, the UE receives a media access control PDU (MAC PDU) related to random access response (RAR) via a random access (RA) procedure. During the RA procedure, the UE monitors a physical downlink control channel (PDCCH) for the MAC PDU according to a random access radio network temporary identifier (RA-RNTI), which identifies time-frequency resource utilized by the UE to transmit a random access preamble. The MAC PDU consists of a MAC header and a MAC payload. The MAC header includes one or more MAC sub-headers. The payload includes one or more MAC random access responses (MAC RARs) and optionally padding. Each sub-header including a random access preamble identifier (RAPID) corresponds to a MAC RAR, except for a backoff indicator (BI) sub-header. After the MAC PDU is received, the UE finds a RAPID matching the a RA preamble previously transmitted by the UE from the RAPIDs of the MAC sub-headers and then obtains corresponding MAC RAR, herein after called MAC RAR_1, according to the matching RAPID.

Figure 3:
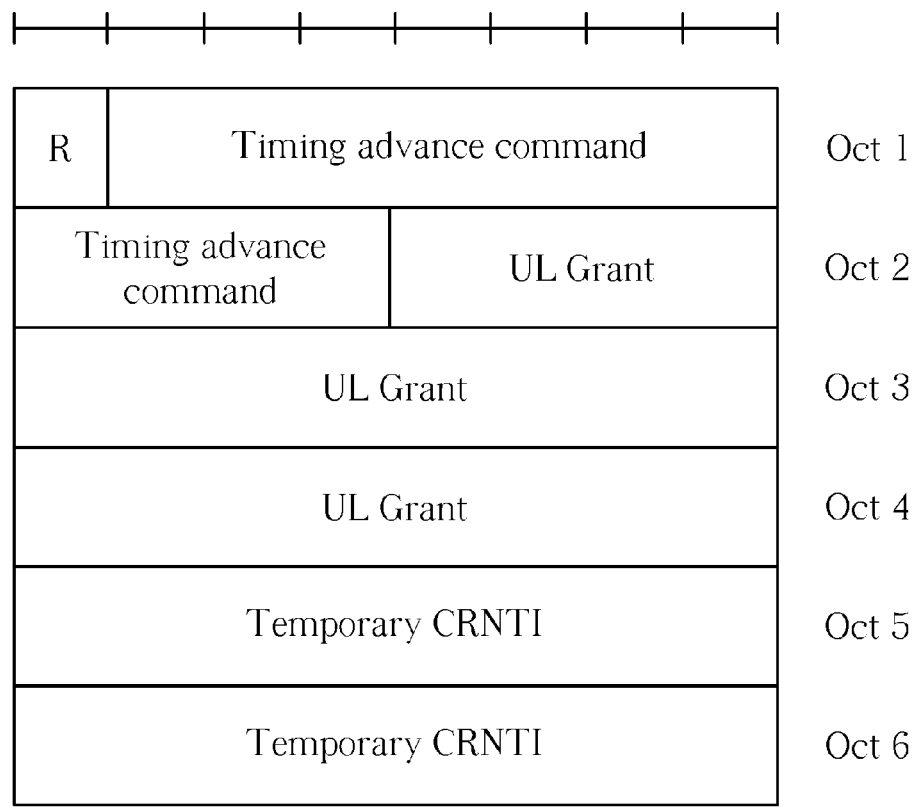
FIG. 3 is a schematic diagram of a MAC RAR according to FIG. 1.

In the next step, the UE verifies the received payload by verifying multiple fields of the MAC RAR_1, such as a timing advance (TA) command field, an uplink (UL) grant field, and temporary cell radio network temporary identifier (C-RNTI) field of the MAC RAR_1. The predetermined payload format can be used as the format referring to FIG. 3. In this situation, the TA command field of the MAC RAR_1 can be determined to be invalid if the field value is out of the 0-1282 range.

When any of the aforementioned fields has an invalid field value, an invalid format, or invalid length, the UE determines the MAC RAR_1 is invalid and thus ignores the MAC RAR_1 as if the MAC RAR_1 would have never been received.

If a MAC PDU has more than one MAC RAR_1, the UE, by the same token, verifies the rest of MAC RAR is and repeats the operations mentioned above. If the verifications of all MAC RAR is related to the matching RAPID show that the MAC RAR is are invalid, the UE considers that the received MAC PDU does not have a matching RAPID and then continues to monitor the PDCCH for another MAC PDU identified by the RA-RNTI in order to retrieve the rest of random access window associated with the UE. In other words, the UE continues the corresponding RA procedure and thereby considers that the MAC RAR reception is unsuccessful when no valid MAC RAR is received within the rest of the RA windows.

In addition, if the MAC PDU includes the BI sub-header, the UE applies the backoff indicator.

Thus, through verifying the fields of the MAC RAR_1(s), the UE can determine whether the MAC RAR_1(s) is valid or not. If the MAC RAR_1(s) is invalid, the UE ignores the MAC RAR_1(s) and considers that the MAC RAR_1(s) would have never been received. If all MAC RARs are invalid, the UE considers that the received MAC PDU does not have a matching RAPID and continues to monitor the PDCCH for another MAC PDU identified by the RA-RNTI. The UE keeps checking available MAC RAR_1s of other received MAC PDUs until the last one is verified. Consequently, the embodiment of the present invention can prevent the UE from applying invalid MAC RAR field values, which may cause a RA procedure error, as well as defines error handling behavior for the MAC RAR.

Figure 1:
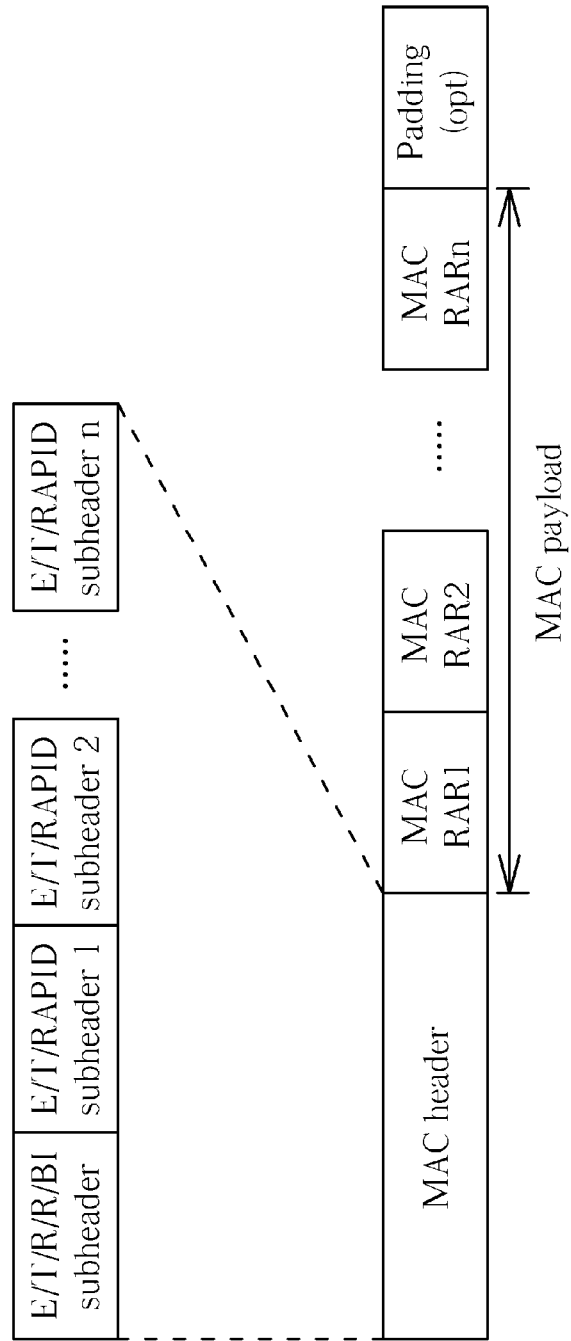
FIG. 1 is a schematic diagram of a MAC PDU according to the prior art.
Figure 2:
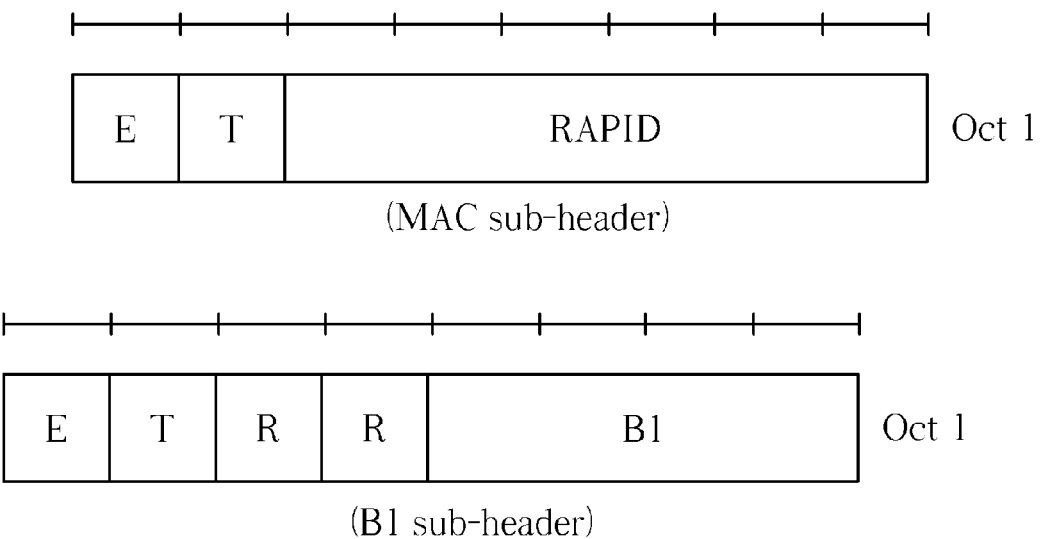
FIG. 2 is a schematic diagram of MAC sub-headers according to FIG. 1.
Figure 7A:
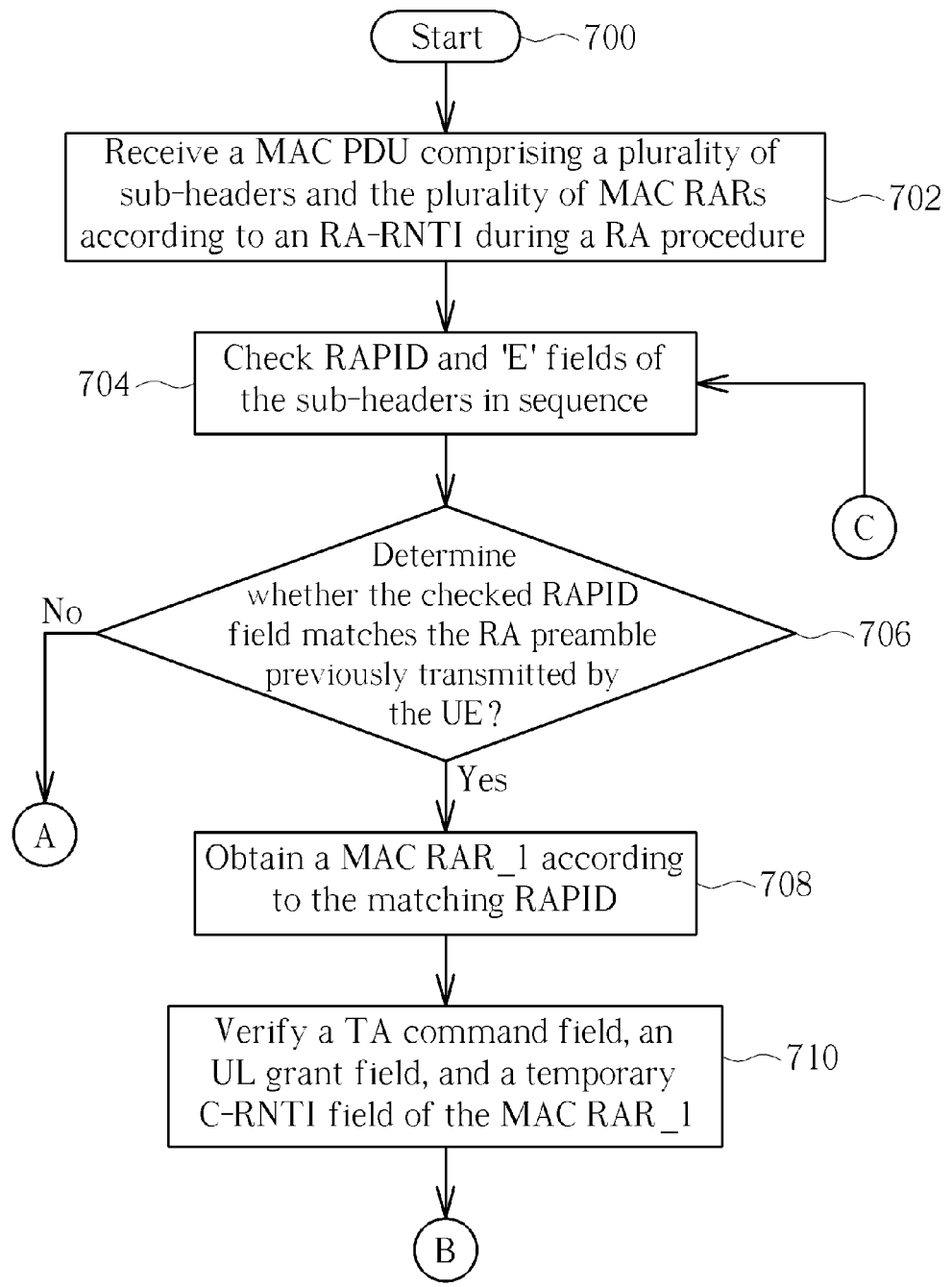
FIG. 7 is a flowchart of the process according to an embodiment of the present invention.
Figure 7B:
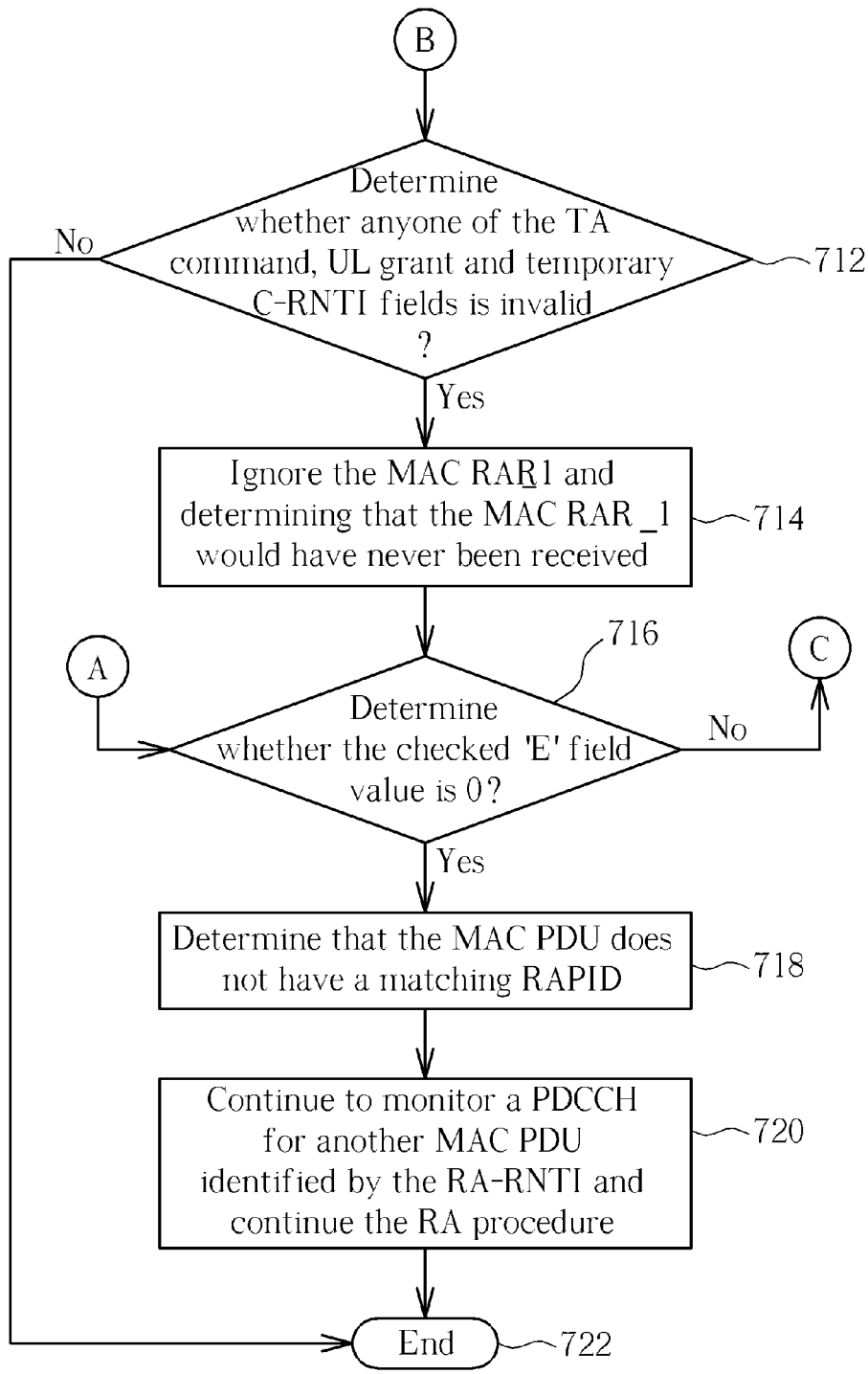

Please refer to FIG. 7, which is a flowchart of the process 70 according to an embodiment of the present invention. The process 70 is utilized for handling error of a MAC PDU with the packet format of FIGS. 1-3 for a UE in a wireless communication system. The process 70 can be compiled into the program code 514 and includes the following steps:

Step 700: Start.

Step 702: Receive a MAC PDU comprising a plurality of sub-headers and the plurality of MAC RARs according to an RA-RNTI during a RA procedure.

Step 704: Check RAPID and 'E' fields of the sub-headers in sequence.

Step 706: Determine whether the checked RAPID field matches the RA preamble previously transmitted by the UE? If so, go to Step 708; otherwise, go to Step 716.

Step 708: Obtain a MAC RAR_1 according to the matching RAPID.

Step 710: Verify a TA command field, an UL grant field, and a temporary C-RNTI field of the MAC RAR_1.

Step 712: Determine whether anyone of the TA command, UL grant and temporary C-RNTI fields is invalid? If so, go to Step 714; otherwise, go to Step 722.

Step 714: Ignore the MAC RAR_1 and determining that the MAC RAR_1 would have never been received.

Step 716: Determine whether the checked 'E' field value is 0? If so, go to Step 718; otherwise, go to Step 704.

Step 718: Determine that the MAC PDU does not have a matching RAPID.

Step 720: Continue to monitor a PDCCH for another MAC PDU identified by the RA-RNTI and continue the RA procedure.

Step 722: End.

According to the process 70, the RAPID and 'E' fields of the sub-headers are checked one by one in sequence but the checking can be interrupted if a valid MAC RAR_1 is received. The 'E' field set to "0" indicates that the corresponding MAC RAR is the last MAC RAR of the MAC PDU, whereas the 'E' field set to "1" indicates that still other sub-header elements corresponding to MAC RARs exist. In Steps 716-718, the UE checks the last MAC RAR that is determined to be invalid and therefore turn to another MAC PDU within the RA window for appearance of a valid MAC RAR. The detailed operations of the process 70 can be found by referring the aforementioned description, and thus is not elaborated on herein.

Certainly, the embodiment of the present invention can adopt alternative steps in the process 70. For example, rather than ignores the MAC RAR, the UE stops monitoring the PDCCH for another MAC PDU identified by the RA-RANTI, and announces that a reception of the RAR is not successful. Subsequently, the UE continues the corresponding RA procedure to re-select random access resources and RAPID.

Likewise, according to another embodiment of the present invention, the process 60 can be applied to all MAC PDUs mapped to a common control channel (CCCH), where the MAC PDUs each include a header and a payload having MAC control elements and MAC SDUs (Service Data Units). The UE receives a MAC PDU on a DL-SCH (Downlink Shared Channel) according to a temporary C-RNTI allocated via the PDCCH, the UE finds the sub-header whose LCID (logic channel identify) field is '00000 ' representing the CCCH and obtains corresponding MAC control element or MAC SDU according to the sub-header. Subsequently, the UE verifies the MAC control element/MAC SDU according to length, and value ranges admitted by both the UE and the network. If the verification turns out a failure, the UE determines that the MAC control element is invalid and discards the received MAC PDU. Thus, the UE can ensure the validity of the received MAC PDU mapped to the CCCH, offering the key to handling packet error of the MAC PDU mapped to CCCH. Further, the procedure error can be avoided.

The MAC control element could be any of MAC control elements as follows: buffer status report MAC control element, C-RNTI MAC control element, DRX command MAC control element, UE contention resolution identity MAC control element, timing advance command MAC control element, and power headroom MAC control element. Take an example of the timing advance command MAC control element, the timing advance command MAC control element consists of an R field and a timing advance command field. The R field is reserved bit of two bits. The timing advance command field is used to control the amount of timing adjustment that the UE has to apply. The length of the timing advance command field is six bits. Therefore, the UE may verify a format of the MAC control element, the lengths and field values of the reserved bit and the timing advance command field.

Figure 8:
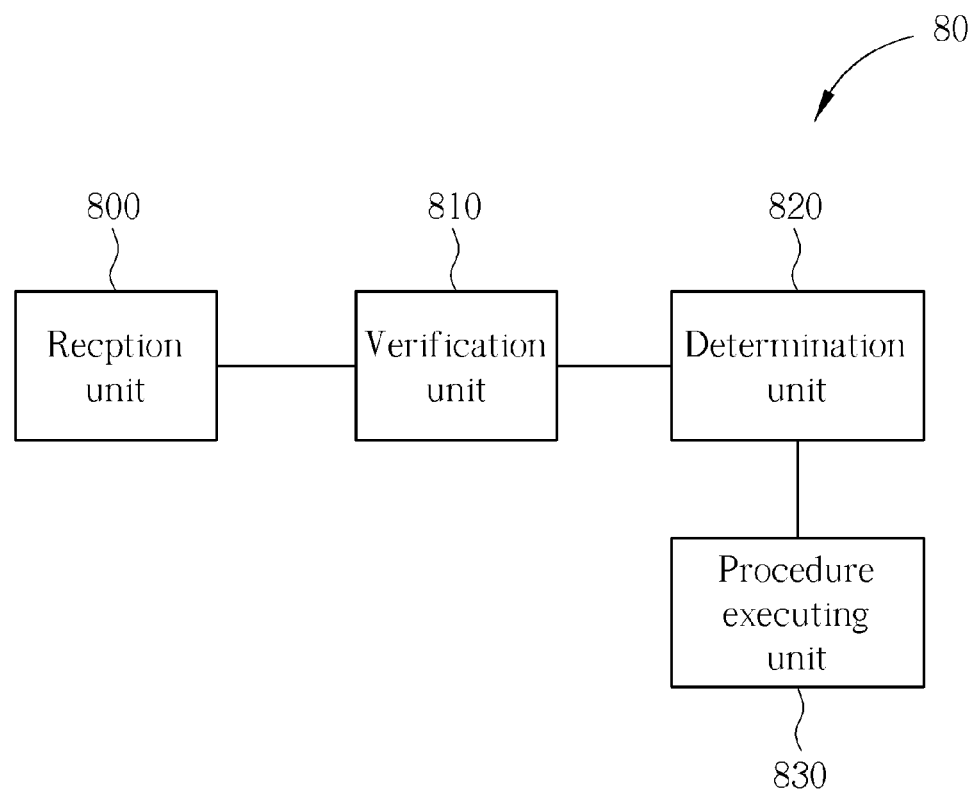
FIG. 8 is a schematic diagram of a communication device according to an embodiment of the present invention.

Please refer to FIG. 8, which is a schematic diagram of a communication device 80 according to an embodiment of the present invention. The communication device 80 is utilized for implementation of the processes 60, 70 and could be applied to the aforementioned UE. The communication device 80 includes a reception unit 800, a verification unit 810, a determination unit 820, a procedure executing unit 830, and a procedure executing unit 840. The reception unit 800 is utilized for obtaining a payload corresponding to the communication device 80 from a protocol data unit (PDU). The PDU could be any types of PDU (e.g. a media access control PDU, hereinafter called MAC PDU). Preferably, the payload may include a plurality of MAC RARs. The PDU is received via a procedure (e.g. random access (RA) procedure). Preferably, the reception unit 800 is further utilized for receiving the PDU comprising a plurality of sub-headers and the plurality of RARs according to a RNTI. For MAC PDU for RAR, the reception unit 800 further finds a RAPID matching the RA preamble of the communication device 80 from the plurality of sub-headers, and obtaining a RAR R1 according to the matching RAPID. The verification unit 810 is utilized for verifying the payload For example, the verification unit 810 verifies a timing advance (TA) command field, an uplink (UL) grant field and a temporary C-RNTI field of the RAR R1 according to a predetermined payload format. The determination unit 820 is utilized for ignoring the verified RAR R1, determining that the RAR R1 would have never been received, when a verification result indicates that the RAR R1 is invalid, determining that the PDU does not have a RAPID matching a previously transmitted RA preamble of the communication device, and determining that reception of the RAR R1 is not successful. The procedure executing unit 840 is utilized for applying a backoff indicator according to a BI sub-header, continuing to monitor the RNTI and continuing the RA procedure, stopping monitoring a RNTI of the communication device and continuing the RA procedure, continuing to monitor the RNTI and continuing the RA procedure.

Likewise, the communication device 80 can be utilized for verifying a MAC PDU mapped to the CCCH to ensure validity of the received MAC PDU mapped to the CCCH. The received MAC PDU comprises a plurality of sub-headers and the plurality of MAC control elements. The reception unit 800 further obtains a MAC control element/MAC SDU corresponding to LCID field of the header that is '00000'. The verification unit 810 further verifies the fields of different types of the MAC control elements, such as buffer status report MAC control element, C-RNTI MAC control element, DRX command MAC control element, UE contention resolution identity MAC control element, timing advance command MAC control element, and power headroom MAC control element according to the predetermined payload format. The determination unit 820 is further utilized for discarding the PDU when a verification of the payload indicates the PDU has an invalid field or an invalid field value.

The detailed operations of the communication device 80 can be known by referring the aforementioned description, and therefore not detailed herein.

To sum up, the embodiments of the present invention receive the PDU via any procedure and obtain the payload from the received PDU. The embodiment of the present invention next verifies particular fields of the payload to handle packet error for a UE in a wireless communication system. If verification indicates the payload is invalid, the embodiments of the present invention take corresponding actions to prevent the UE from applying an invalid field value, thereby avoiding procedure error.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling packet error for a communication device in a wireless communication system, the method comprising the steps of:
    obtaining a payload corresponding to the communication device from a received protocol data unit (PDU); and
    verifying the payload according to a predetermined payload format related to a length and a value range of a payload element, comprising verifying a temporary cell radio network temporary identifier (C-RNTI) field according to the predetermined payload format.

2. The method of claim 1, wherein the payload comprises a plurality of random access responses (RARs) and the PDU is received via a random access (RA) procedure.

3. The method of claim 2, wherein verifying the payload according to the predetermined payload format comprises:
    verifying a timing advance (TA) command field of a first RAR according to the predetermined payload format; and
    verifying an uplink (UL) grant field of the first RAR according to the predetermined payload format;
    verifying the temporary cell radio network temporary identifier (C-RNTI) field of the first RAR according to the predetermined payload format.

4. The method of claim 3 further comprising determining that the first RAR is invalid when at least one of the TA, UL grant, and C-RNTI fields is invalid.

5. The method of claim 2, wherein obtaining the payload from the received PDU comprises:
    receiving the PDU comprising a plurality of sub-headers and the plurality of RARs according to a random access radio network temporary identifier (RA-RNTI);
    from the plurality of sub-headers, finding a random access preamble identifier (RAPID) matching a RA preamble of the communication device; and
    obtaining a first RAR according to the matching RAPID.

6. The method of claim 1 further comprising the step of applying a backoff indicator according to a backoff indicator (BI) sub-header, wherein the PDU further comprises the BI sub-header.

7. The method of claim 2 further comprising the steps of:
    ignoring a first RAR of the RARs and determining that the first RAR would have never been received, when a verification result indicates that the first RAR is invalid and verifying the rest of the RARs;
    determining that the PDU does not have a random access preamble identifier (RAPID) matching a RA preamble of the communication device when all the RARs are verified to be invalid;
    continuing to monitor a control channel for other PDUs identified by an random access radio network temporary identifier (RA-RNTI); and
    continuing the RA procedure.

8. The method of claim 2 further comprising the steps of:
    stopping monitoring a control channel for other PDUs identified by a random access radio network temporary identifier (RA-RNTI) of the communication device when a verification result indicates a first RAR of the RARs is invalid;
    determining that reception of a the first RAR is not successful; and
    continuing the RA procedure.

9. The method of claim 1, wherein obtaining the payload corresponding to the communication device from the PDU comprises:
    receiving the PDU mapped to a common control channel (CCCH), the PDU comprising a plurality of sub-headers and the payload.

10. The method of claim 9 further comprising the steps of:
    discarding the PDU when a verification result of the payload indicates the payload has an invalid field or an invalid field value.

11. The method of claim 9, wherein verifying the payload according to the predetermined payload format comprises verifying at least one of control elements of a buffer status report media access control (MAC) control element, cell radio network temporary identifier (C-RNTI) MAC control element, discontinuous reception (DRX) command MAC control element, user equipment (UE) contention resolution identity MAC control element, timing advance command MAC control element, and power headroom MAC control element.

12. A communication device of a wireless communication system for handling packet error, the communication device comprising:
    a reception unit for obtaining a payload corresponding to the communication device from a protocol data unit (PDU); and
    a verification unit for verifying the payload according to a predetermined payload format related to a length and a value range of a payload element, further comprising verifying a temporary cell radio network temporary identifier (C-RNTI) field according to the predetermined payload format.

13. The communication device of claim 12, wherein the payload comprises a plurality of random access responses (RARs) and the PDU is received via a random access (RA) procedure.

14. The communication device of claim 13, wherein the verification unit verifies a timing advance (TA) command field of a first RAR, an uplink (UL) grant field of the first RAR and a the temporary cell radio network temporary identifier (C-RNTI) field of the first RAR, according to the predetermined payload format.

15. The communication device of claim 14 further comprising a determination unit for determining that the first RAR is invalid when at least one of the TA, UL grant, and C-RNTI fields is invalid.

16. The communication device of claim 13, wherein the reception unit receives the PDU comprising a plurality of sub-headers and the plurality of RARs according to a random access radio network temporary identifier (RA-RNTI), finds a random access preamble identifier (RAPID) matching the RA preamble of the communication device, from the plurality of sub-headers, and obtains a first RAR according to the matching RAPID.

17. The communication device of claim 12 further comprising a procedure executing unit for applying a backoff indicator according to a BI sub-header, wherein the PDU further comprises the BI sub-header.

18. The communication device of claim 13 further comprising a determination unit for ignoring a first RAR of the RARs and determining that the first RAR has never been received, when a verification result indicates that the first RAR is invalid and verifying the rest of the RARs.

19. The communication device of claim 18, wherein the determination unit further determines that the PDU does not have a random access preamble identifier (RAPID) matching a RA preamble of the communication device when all the RARs are verified to be invalid.

20. The communication device of claim 19 further comprising a procedure executing unit for continuing to monitor a control channel for other PDUs identified by a random access radio network temporary identifier (RA-RNTI) when the PDU is determined that it does not have the RAPID matching the RA preamble, and for continuing the RA procedure.

21. The communication device of claim 13 further comprising a determination unit for determining that reception of a first RAR of the RARs is not successful.

22. The communication device of claim 21 further comprising a procedure executing unit for stopping monitoring a control channel for other PDUs identified by a random access radio network temporary identifier (RA-RNTI) when a verification result indicates the first RAR is invalid, and for continuing the RA procedure when the reception of the first RAR is determined to be not successful.

23. The communication device of claim 13, wherein the reception unit receives the PDU mapped to a common control channel (CCCH), the PDU comprising a plurality of sub-headers and the payload.

24. The communication device of claim 23 further comprising a determination unit for discarding the PDU when a verification of the payload indicates the PDU has an invalid field or an invalid field value.

25. The communication device of claim 23, wherein the verification unit further verifies of at least one of control elements of a buffer status report media access control (MAC) control element, cell radio network temporary identifier (C-RNTI) MAC control element, discontinuous reception (DRX) command MAC control element, user equipment (UE) contention resolution identity MAC control element, timing advance command MAC control element, and power headroom MAC control element, according to the predetermined payload format.

* * * * *